Figure 1:
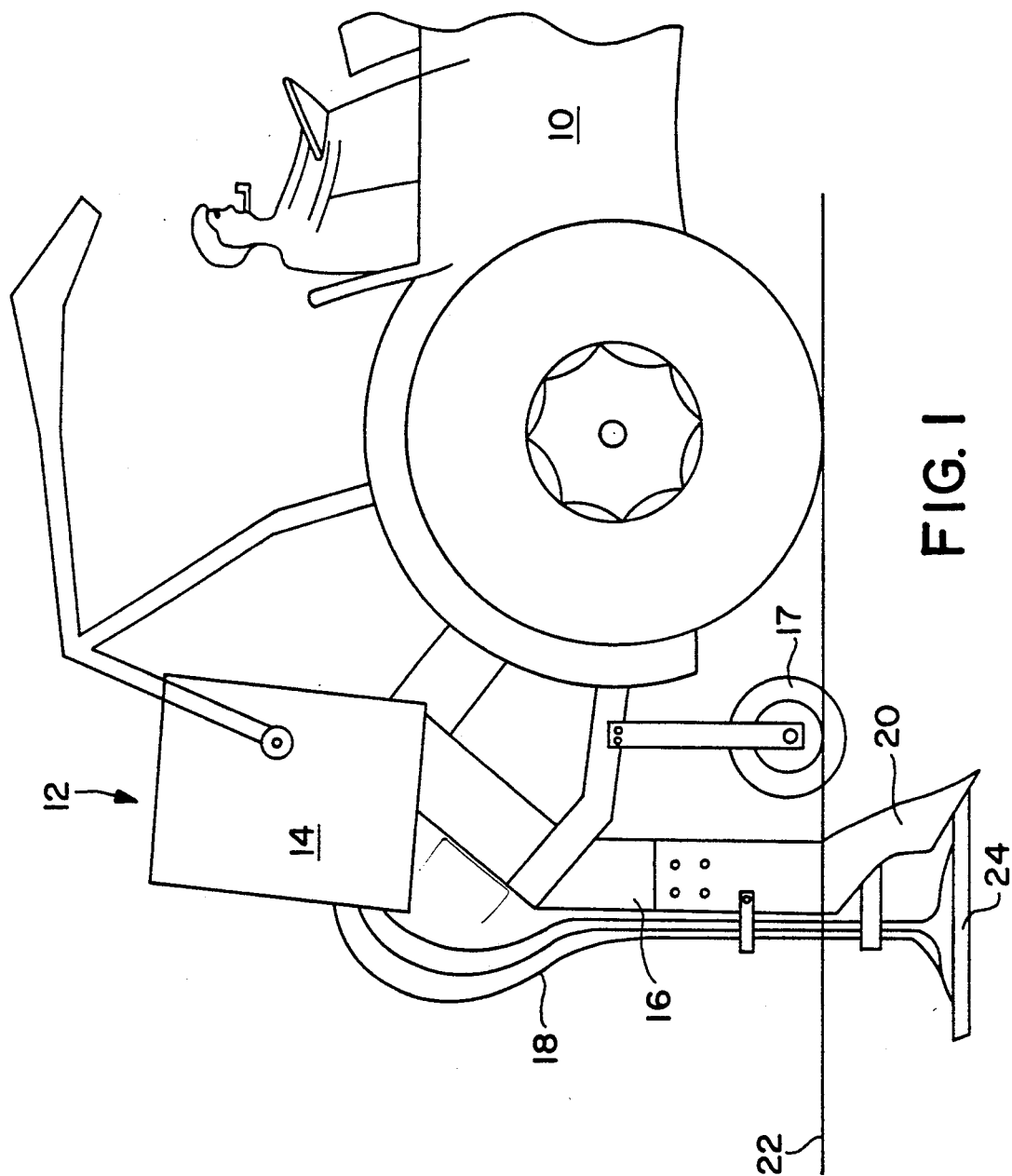
Figure 2:
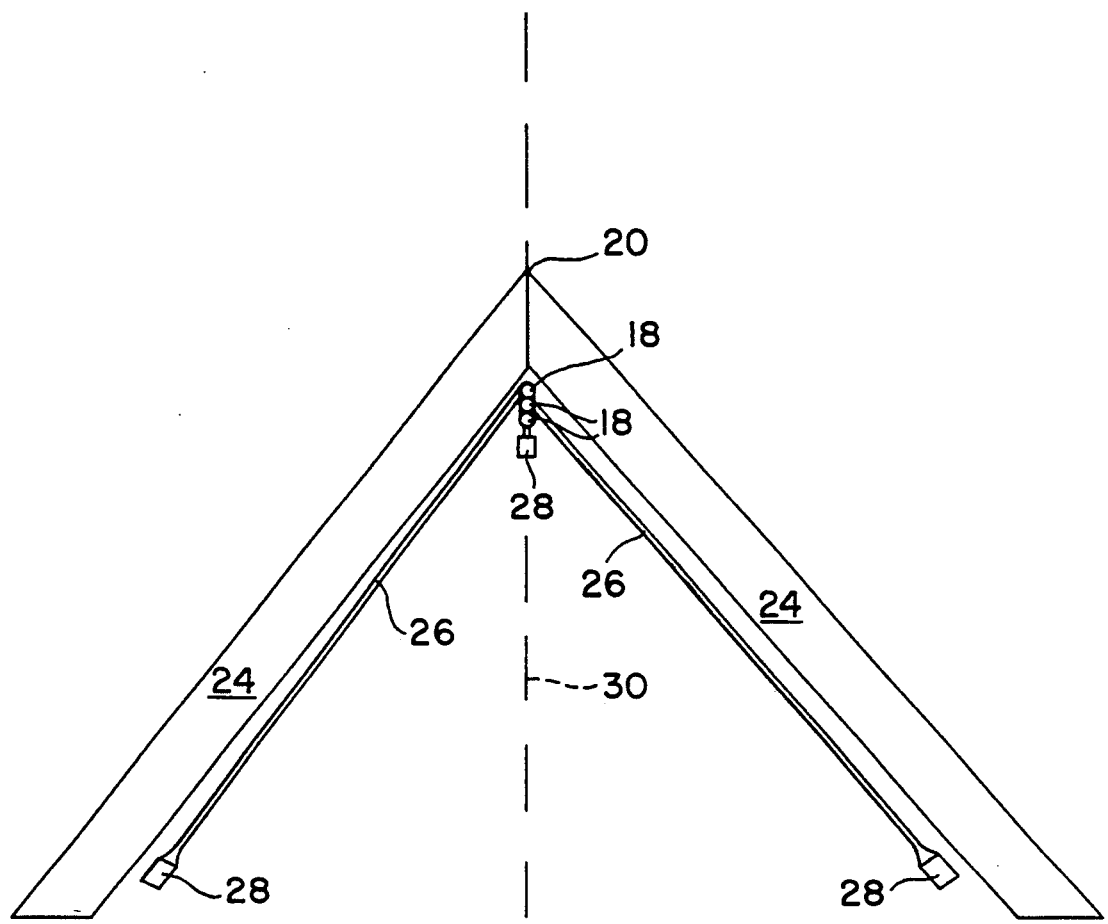
Figure 3:
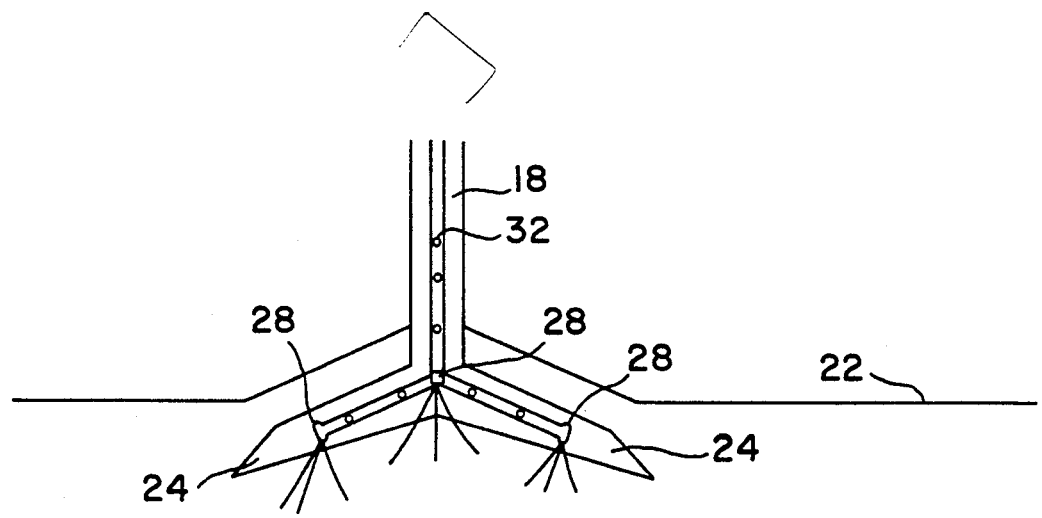

United States Patent [19]

Salestrom

[11] Patent Number: 5,303,663
[45] Date of Patent: Apr. 19, 1994

[54] SUBSURFACE PARTICLE INJECTION METHODS

[75] Inventor: Ronald D. Salestrom, Tucson, Ariz.

[73] Assignee: Soil Injection Layering Systems, Inc., Tucson, Ariz.

[21] Appl. No.: 880,907

[22] Filed: May 8, 1992

[51] Int. Cl.⁵ .............................................. A01C 21/00
[52] U.S. Cl. ......................................... 111/200; 47/9; 71/903; 111/900; 111/174; 111/118; 111/76; 172/40
[58] Field of Search ............... 111/200, 900, 174, 917, 111/118, 76; 405/263, 269; 47/9; 71/69, DIG. 1, 903; 172/40

[56] References Cited

U.S. PATENT DOCUMENTS

| | | | |
|---|---|---|---|
| 3,336,129 | 8/1967 | Herrett | 71/92 |
| 3,417,171 | 12/1968 | Eberle | 71/903 |
| 3,752,236 | 8/1973 | Foster | 172/753 |
| 3,759,197 | 9/1973 | Bracke | 111/200 |
| 3,878,175 | 4/1975 | Steckler | 521/149 |
| 3,880,242 | 4/1975 | Rogers | 172/753 |
| 3,981,100 | 9/1976 | Weaver et al. | 71/903 |
| 4,051,630 | 10/1977 | Bishop | 111/200 |
| 4,058,124 | 11/1977 | Yen et al. | 47/9 |
| 4,078,866 | 3/1978 | Hawkins | 172/762 |
| 4,155,314 | 5/1979 | O'Callaghan et al. | 111/200 |
| 4,168,593 | 9/1979 | Jankowiak | 111/118 |
| 4,241,537 | 12/1980 | Wood | 47/77 |
| 4,320,040 | 3/1982 | Fujita et al. | 524/459 |
| 4,463,509 | 8/1984 | Leonard | 172/40 |
| 4,495,724 | 1/1985 | Kirkland et al. | 47/57.6 |
| 4,540,427 | 9/1985 | Helbling | 47/9 |
| 4,559,074 | 12/1985 | Clarke | 71/903 |
| 4,606,675 | 8/1986 | Mitani et al. | 405/263 |
| 4,797,145 | 1/1989 | Wallace et al. | 71/27 |
| 4,906,276 | 3/1990 | Hughes | 71/77 |
| 4,985,061 | 1/1991 | Hughes | 71/68 |
| 4,985,062 | 1/1991 | Hughes | 71/77 |
| 5,001,995 | 3/1991 | Mikkelsen | 172/722 |
| 5,033,398 | 7/1991 | Froc | 111/176 |
| 5,107,928 | 4/1992 | Hitterhaus | 405/263 |
| 5,136,954 | 8/1992 | Fetaz et al. | 172/723 |

FOREIGN PATENT DOCUMENTS

| | | | |
|---|---|---|---|
| 274348 | 12/1989 | Fed. Rep. of Germany | 47/9 G |
| 204680 | 11/1984 | Japan | 47/9 |
| 34572 | 8/1990 | Japan | 47/9 |

OTHER PUBLICATIONS

"This is Not a Test," Hydro Resources Southwest, Inc. flyer (1990–1991).
"Hydro Hold," Hydro Resources Southwest, Inc. Flyer (1990–1991).
"The Role of Polymers in Water Management," *Golf & Sports Turf* (vol. 6, No. 6, Jun. 1990).

(List continued on next page.)

Primary Examiner—Randolph A. Reese
Assistant Examiner—Spencer Warnick
Attorney, Agent, or Firm—Steven G. Lisa; Peter C. Warner

[57] ABSTRACT

Disclosed are improvements relating to injection of water-absorbent polymers, including a blend containing fine granules, using one or more air-blown, plowblade applicators. The process creates a "blanket" of moisture-retaining particles for the plant roots. A further aspect of the invention includes drawing a plowblade through the soil at an appropriate shallow angle and speed to establish a wave in the soil, together with the use of a deflector and control over the air pressure, all of which maximizes diffusion and distribution of the injected particles.

25 Claims, 4 Drawing Sheets

OTHER PUBLICATIONS

"Hydro-Hold 90" Applicator," Hydro Resources Southwest, Inc. flyer (1990-1991).

"Hydro-Hold 24" Applicator," Hydro Resources Southwest, Inc. flyer (1990-1991).

"Polymer Product May be Next Major Breakthrough in Water Conservation", *Tucson Citizen* (Jul. 30, 1990).

"Olathe Equipment in Your Sports Turf Program!," Olathe Manufacturing, Inc. flyer (1989-1990).

Rubio, et al., "Effect of Polyacrylamide on Seedling Emergence of Three Grass Species," *Soil Science* (vol. 148, No. 5, Nov. 1989).

"Polyacrylamide and Seedling Emergence," *Soil Science* (vol. 148, No. 5, May 1986).

"What About Those New Soil Polymers?," *Sunset Magazine,* Apr. 1987.

Messina, "Absorbing Issue," *Los Angeles Times,* Mar. 18, 1991.

Smaus, "Super Sponges' Keep Plants From Drying Out," *Los Angeles Times,* Sep. 23, 1990.

"Soil Moist TM Polymers," JRM Holdings, Inc. brochure, Jun. 1990.

Woodhouse, et al., "Effect of Superabsorbent Polymers on Survival and Growth of Crop Seedlings," *Agricultural Water Management* (vol. 20, No. 1, Jul. 1991).

FIG. I

SUBSURFACE PARTICLE INJECTION METHODS

BACKGROUND OF THE INVENTION

Certain water-absorbent polymers are known to speed the growth of commercially valuable plants through improved water management. Some types of polymers used for that purpose include polyacrylate (the absorbent agent used in disposable diapers), polyvinyl alcohol, starch-based copolymers, and cross-linked polyacrylamides. Blends of such agents are also commercially available. The following U.S. Patents, for example, disclose a variety of polymers used with plants, and are incorporated by reference:

U.S. Pat. Nos. 4,985,061 4,985,062, and 4,906,276, all issued to Hughes, disclose an aqueous gel including a highly absorbent, cross-linked, mixed salt of homopolymerized or copolymerized acrylic acid. U.S. Pat. No. 4,797,145, issued to Wallace et al., discloses a group of synthetic agricultural polymers known as polyelectrolytes used in combination with water-soluble polysaccharide. The patent discusses the application of that and a variety of different polymers to the problem of soil conditioning. U.S. Pat. No. 4,241,537, issued to Wood, discloses a dissolved water-soluble polyisocyanete capped prepolymer. U.S. Pat. No. 4,559,074, issued to Clarke, discloses a substantially non-ionic polyacrylamide cross-linked with a low amount of methylenebisacrylamide (MBE) or another agent. U.S. Pat. No. 4,320,040, issued to Fujita, et al., discloses a method of preparing hydro-gel polymers from polyvinyl alcohol and polyacrylic acid. U.S. Pat. No. 3,336,129, issued to Herrett et al., is an early patent describing types of cross-linked polymers.

In general, suitable water-absorbent polymers consist of one or more granular materials that, when wetted, convert to a gel form and that are capable of absorbing and releasing water repeatedly. Suitable polymers can absorb up to several hundred times their weight in water and can repeatedly absorb and release the water for as long as a decade. When placed near the roots of plants, such polymers act as "water banks," absorbing excess water until the plant roots can tap it. When properly applied, suitable polymers can reduce the amount of water lost through percolation and evaporation, reduce the leaching of soil nutrients, pesticides, or herbicides, and improve soil aeration. Those effects improve yields and reduce watering cost significantly.

Until recently, the application of water-absorbent polymers in the agricultural field has been largely limited to improving seed germination, sprig establishment, and plant transfer. In all of those uses, the polymer is generally applied directly to the plant roots, because the plants are temporarily removed from the soil. Also, such polymers can be mixed with soil, for such applications as gardening. For example, the following references, which are also incorporated by reference, disclose such applications: U.S. Pat. No. 4,540,427, issued to Helbling (mixing with removed soil or sand); U.S. Pat. No. 4,495,724, issued to Kirkland et al. (seed coating); the above-cited Hughes patents (coating stems of freshly cut plants for transport or transplant); and the above-cited Clarke patent (mixing with potting soil or synthetic growth media such as mineral wood).

There has been a desire from some time, though, to apply water-absorbent polymers to in-ground crop and turf water-management projects, where it is impractical to remove either the plants or the soil. The potential commercial benefits from such large-scale uses far exceed the benefits achieved from out-of-ground applications. Inefficient or impractical injection means, however, have blocked or rendered impractical in situ granular polymer applications.

Attempts have been made to use standard or modified tilling machines, vibratory plows, seed drills, water-jet injectors, and coring machines to inject polymers, but such efforts have suffered from a variety of problems. Such methods typically disturb the topsoil and the plants. Such disturbance can result in growth shock to the plants. As a result, known methods are largely unsuitable for use in already planted fields, and some require polymer insertion before the plants are grown or even before they are planted.

In addition, earlier methods do not distribute the polymers evenly, thoroughly, or in the most advantageous locations. Such methods often restrict the polymers to horizontal strips on, or vertical grooves or holes in, the field. Appropriate polymers can be relatively expensive, moreover, and past methods have not applied them cost-effectively.

Accordingly, it is a primary object of the present invention to achieve practical methods and means for injecting granular water-absorbent polymers into soil to promote plant growth.

It is another object of the invention to provide methods and apparatus for injecting particle matter near the roots of plants with minimal disturbance of topsoil or plants.

It is another object of the invention to provide methods and apparatus for efficiently spreading particles below the surface into topsoil.

It is another object of the invention to provide a means of improving the yield of crops.

It is another object of the invention to provide a method of improving water management for crops and turf.

It is another object of the invention to provide methods and apparatus for applying granular water-absorbent polymers without disturbing, removing, or replanting turf.

It is another object of the invention to provide methods and apparatus for applying granular water-absorbent polymers evenly and with maximum distribution across a field and with maximum diffusion through a soil layer.

It is another object of the invention to provide methods and apparatus for controlling the locations of injected granular water-absorbent polymers to the necessary depth or range of depths for maximum effect.

It is another object of the invention to provide an improved composition of granular water-absorbent polymers suitable for improved distribution in soil and improved plant yields.

It is another object of the invention to provide methods and apparatus for injecting particles in a horizontal, subsurface plane without causing plant shock.

The present invention achieves the above and other objects by use of a device and process of injecting a blend of water-absorbent polymers, including fine granules, using one or more air-blown, plowblade applicators. The process creates a "blanket" of moisture-retaining particles for the plant roots. A further aspect of the invention includes the method of drawing the blade through the soil at an appropriate shallow angle and speed to establish a wave in the soil, together with the use of a deflector and control over the air pressure, all of which maximizes diffusion and distribution of the injected particles.

Other aspects of the invention will be appreciated by those skilled in the art after a reading of the detailed disclosure of the present invention below.

DESCRIPTION OF THE DRAWINGS

FIG. 1 shows a side view of a preferred applicator used with the injection process of the invention.

FIG. 2 shows a top view of a preferred applicator blade used with the injection process of the invention.

FIG. 3 shows a cross-sectional view of a preferred applicator blade, viewed from the rear during the injection process of the invention.

FIG. 4 shows a highly schematic cross-sectional illustration of a preferred applicator blade, viewed from the side during the injection process of the invention.

FIG. 5 shows a cross-sectional view of another preferred applicator blade, viewed from the side.

FIG. 6 shows a flow chart of a preferred embodiment of the process of the invention.

Common numerals are used in the several figures to indicate similar elements.

DETAILED DESCRIPTION

FIG. 1 illustrates a preferred applicator for injecting particulate matter such as water-absorbent polymers in a fashion so as to spread the particles widely in the subsurface without great disturbance of the ground surface. Tractor 10 tows applicator assembly 12, which contains hopper 14 and shank 16. An air blower (not shown) feeds the particulate matter through feed lines 18 under pressure. Vertically mounted plow blade 20 cuts narrow slits through ground surface 22. Blades 24 provide a wide cut parallel to and below ground level. Weight pressing down on shanks 16 from the remainder of the apparatus helps force blades 24 below the surface. Coulter 17 slits the ground before blade 20 and contains a shoulder that keeps blades 24 at the selected depth.

In large-scale uses, applicator 12 can include multiple shanks 16 spaced apart behind tractor 10, each with its own blades 24 and feed lines 18. Suitable configurations have been developed, for example, with three shanks, each supporting blades with a 60-inch span, which creates a total swath of nearly 16 feet. For smaller-scale uses, applicator 12 can be small enough to be mounted on a motorized carrier that is controlled by the hand of an operator walking along with the carrier, in which case tractor 10 is not needed and coulters 17 are replaced by a surface skid. A trailing wheel (not shown) can also substitute for or supplement coulters 17.

Applicator 12 is composed principally of commercially available subassemblies. A variety of models sold under the trade name "Gandy Box," manufactured by the Gandy Co. of Owatonna, Minn., provides a suitable hopper and air blower assembly with Venturi system. The blade plows manufactured by the Hiniker Co. of Mankato, Minn., provide suitable shank 16 and support assemblies. Hiniker blade plows are available in models with one to ten shanks, each with spring-loaded independent suspension and a plowblade 20 attached. Tractor 10 can be any commercially available tractor of suitable power.

FIG. 2 shows a top view of blades 24. After the initial insertion, only plowblade 20 and vertically disposed feed lines 18 behind it pierce the ground surface, thereby requiring ground-level disturbance only along the line through which plowblade 20 passes, shown as dashed line 30 in FIG. 2. The remainder of the elements shown in FIG. 2 remain under the surface while in operation.

Suitable versions of blades 24 are sold by the John Deere Company in a variety of sizes. Because blades 24 can have a large horizontal span, disturbance lines 30 need not be close together, and the plants and topsoil between disturbance lines 30 will remain intact, except as caused by the passage of the equipment wheels. In the large configuration mentioned above, for example, the disturbance lines will be 60 inches apart. An applicator with blades 24 having a wingspan of 28 inches has also been developed, and an example of the walk-along applicator described above has a wingspan of 16 inches. Smaller models are more suitable for hilly terrain, where larger-span blades 24 might have difficulty following the contour of the surface.

Custom-designed feed lines 18 pass through the plane of the surface immediately behind plowblade 20 and continue to form extensions 26, which are largely situated behind blades 24. Feed lines 18 and extensions 26 should be situated so as to provide a minimum of additional profile area as blades 20 and 24 are dragged through the soil. Blades 20 and 24 should be sturdy enough to deflect ordinary subsurface obstacles, such as roots, thatch, and rocks, while protecting lines 18 and 26.

Hollow feed lines 18 terminate at a series of outlets 28. Three such outlets are shown in FIG. 2, but other numbers are possible. FIG. 2 shows three separate feed lines 18, one for each outlet 28, but that configuration can also be varied. FIG. 3 shows, in a somewhat schematic cross-section, the lower portion of applicator 12 as blades 24 move through the earth. Particle matter 32, originally stored in hopper 14 (FIG. 1), passes through feed lines 18, under air pressure imparted by the blower, and exits lines 18 at outlets 28 below ground surface 22.

FIG. 4 shows a schematic cross-section, taken in a vertical plane perpendicular to blade and passing near one end of blade 24. Blade 24 moves below surface 22 in the direction of arrow D, lifting earth 36 and creating a travelling wave. Blade 24 can be adjusted to pass at a range of depths, between two and ten inches below the surface, by making the appropriate adjustment on shank 16 (in FIG. 1). It is desirable, however, to set blade 24 to pass at a depth so that it cuts the lower portion of the roots of the plants already planted on surface 22, thereby accelerating the growth of roots into the hydrated polymer without causing significant plant shock.

FIG. 4 is oversimplified, however, in that the portion of earth 36 that forms the wave behind blade 24 mixes with a large number of air pockets and becomes cracked and turbulent as blade 24 passes, rather than forming a single, cohesive air pocket roughly the depth of blade 24. Nevertheless, if a properly adjusted blade 24 passes at sufficient depth, such as near the lower portion of the root mass, surface 22 will not crack or lose its integrity and the subsurface earth 36 will settle generally back into position. The passage of blade 24 has the further salutary effect of aerating the lower layers of topsoil.

The problem of keeping blades 24 below the surface and achieving robust cracking and mixing in the subsurface wave, while at the same time allowing the soil to resettle and avoiding disturbance of the surface and plants, demands a great deal of sensitivity in the configuration and control of the applicator. It has been found important, in particular, to control the angle A of blades 24 and the speed of the apparatus, which controls the nature of the wave in earth 36. If blade angle A is too shallow or the speed is too slow, the wave will not be sufficiently great to permit robust subsurface cracking and mixing. Also, it is important, for similar reasons, to perform the procedure on relatively dry soil. Conversely, if blade angle A becomes too great or the speed is too fast, the wave becomes too large, which may result in surface or plant damage and makes the soil too fluffy, preventing it from settling back into place.

Optimal results have been achieved in dry soil by setting a face of blade 24 at an angle A of 10–15 degrees and a speed of 3–6 miles per hour. Blade angles that shallow require modification of standard shanks 16 (FIG. 1), which typically are manufactured so as to set blades 24 either at an angle A of 20–30 degrees or flat (or nearly so) with respect to a plane parallel to the surface. The adjustment requires removing and re-welding on each shank a pair of flanges, to which blades 24 are bolted, at the shallower angle.

Smaller, walk-along machines suitable for use in compact areas cannot develop the speeds described above. It has been found to be an acceptable substitute in such applications to add a mechanical oscillator capable of vibrating blades 24 forward and back as the machine operates. Such vibrations add extra mixing and cracking action that overcomes the losses from the slow speed. The vibrations can be useful in larger, tractor-driven applicators, too.

In one embodiment, the mechanical oscillator (not shown) comprises a suitable hydraulic motor with its shaft set parallel to the ground surface and perpendicular to the direction of travel. A circular disk with a groove on its outer face just inside the circumference is fixed onto the end of the motor's shaft. A pin is set in a vertical slot through shank 16 (FIG. 1) with its end fitted into the groove. As the motor turns, the pin reciprocates shank 16 forward and back, but not vertically.

Figure 4:
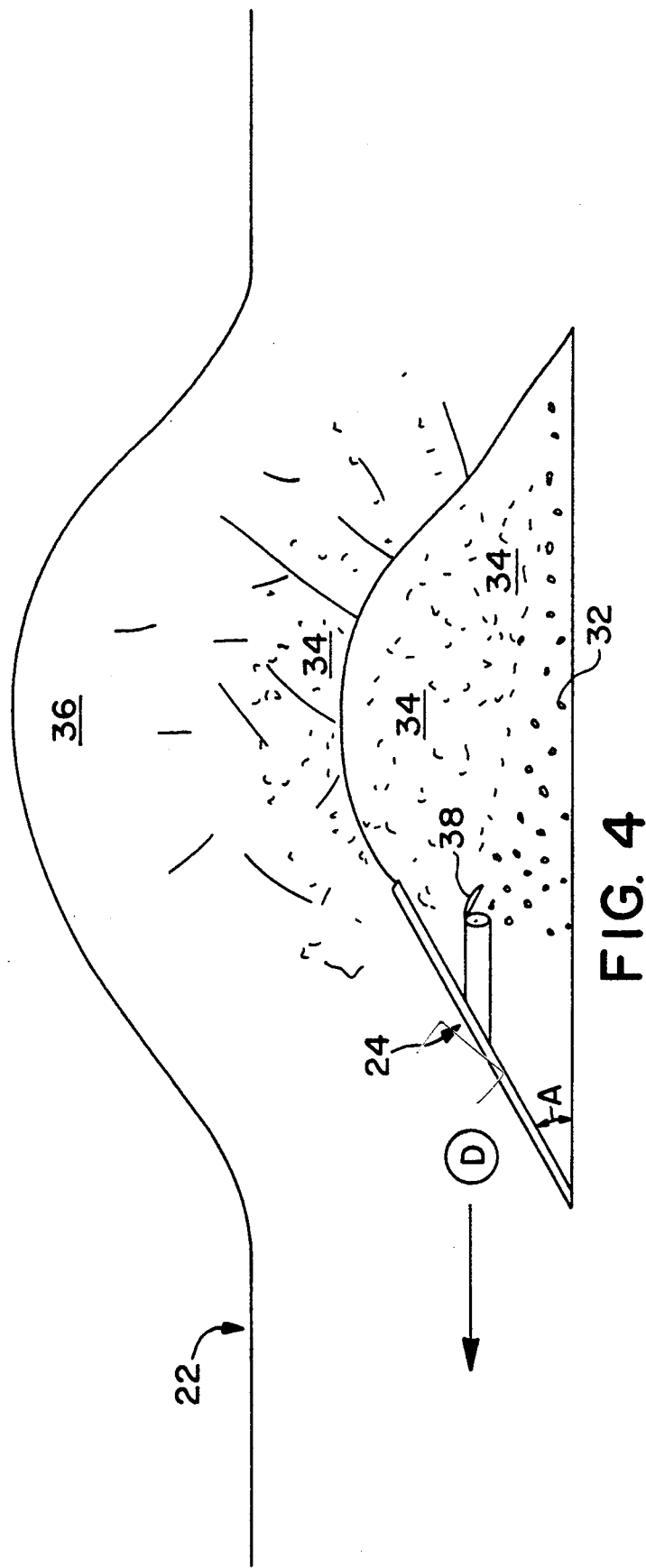
Figure 5:
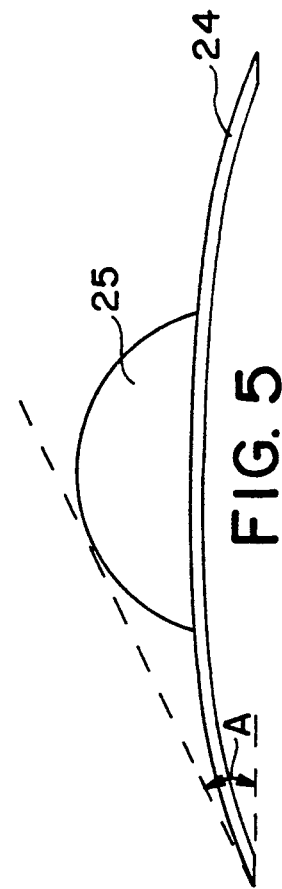

FIG. 5 shows, in cross-section, an alternate blade 24 suitable for use with the oscillator. Blade 24 may be flat or (as shown) slightly curved, with a maximum angle of five degrees at the steepest point. Cap 25 is a welded "hump" extending along blade 24. In the alternate configuration, the "face" of the blade is defined as angle A, between the bottom of blade 24 and a plane tangent to the front of the blade and the top of cap 25, shown as broken lines in FIG. 5 and analogous to angle A in FIG. 4. That "face" should be set at the same 10–15 degree angle. The alternate design creates the wave action as the oscillator moves cap 25 back and forth, while permitting blade 24 to have sharp edges to cut through the soil, even at slower speeds.

As either sort of blade 24 passes through earth 36, granules 32 fall from outlets 28 and are spread approximately at the depth through which the lower portion of blade 24 passes. Because of the air pressure, however, lighter granules 34 fly, rather than fall, out of outlets 28. Therefore, particles 34 can mix with layers of earth substantially higher than the level through which blade 24 passes, provided that the wave is large enough to create sufficient cracking and mixing and that the air pressure is set correctly. Consequently, particles 32 and 34 are distributed throughout a three-dimensional volume of soil extending above the plowblade.

To improve diffusion, a preferred embodiment of outlet 28 contains deflector 38, which can comprise simply a metal flange perhaps two or three inches wide, which is bent at a 30-degree angle and coupled to the trailing end of outlet 28. The deflector extends about two inches past the end of outlet 28, and particles strike it and scatter horizontally.

It has been found that the air pressure should be set so as to create a diffusion rate passing said deflector at the trailing end of outlet 28 of at least approximately 45 cubic feet per minute. Higher pressures may be desirable, but if the diffusion rate exceeds about 90 cubic feet per minute, the air will blow tunnels in the soil, thereby restricting the distribution of both the air and the particulates.

If desired, the applicator can be used to inject virtually any desired dry, granular soil additives, including pesticides, herbicides, fertilizers, seeds, or a mixture of several of those. The application process, however, has been found particularly useful for injection of water-absorbent polymers. It is also possible to include some or all of the above-listed additives with the water-absorbent polymers, either by mixing those particulates with the polymers in hopper 14 (FIG. 1) or by using multiple hoppers.

An optimal water-absorbent polymer should have the ability to absorb and release a large quantity of water quickly, repeatedly, and for a long time, should have a high absorbency factor, must be insoluble in water and various other organic solvents, and should be biodegradable and leave no more than minute residues of undesirable acrylamide monomers or acrylonitrite.

A beneficial side-effect is that the polymers work to aerate the soil, which can promote plant growth, by repeatedly expanding and contracting during the hydration and dehydration cycle. The air-injection system of the invention provides an additional aeration effect. Another beneficial side-effect is that the expansion and contraction of the polymers prevents the soil from "crusting," which can retard plant growth.

One form of water-absorbent polymer that has been found particularly suitable is commercially available under the trade name Stockosorb 300 from Stockhausen, Inc. of Greensboro, N.C. That product consists of 60% polyacrylamide and the remainder cross-linked polyacrylate. Compositions containing higher proportions of polyacrylate absorb water faster but have the disadvantage of wearing out after a small number of cycles of water intake and release, which sharply reduces their operative lifetime. The 60-40 composition has been found to provide a suitable trade-off between life and absorption rate.

Suitable products can absorb up to 200–500 times their dry weight in water within 20 minutes to an hour, release up to 95 percent of the water on demand, and repeat the re-hydration cycle reliably over a period of five to six years. Products such as the ones described above are typically sold in standard grain sizes, including 1–2 millimeter or 1–4 millimeter in diameter, for in-soil applications. Fine-grain grade, with particle sizes of 0–0.5 millimeters, are commercially available and are often used as root dip on bare-root plants.

When wetted, the fine grind of polymer has the characteristic of forming a sticky mass of absorbent material. The standard, larger grades, by contrast, form clumps of gel. Agricultural chemists and engineers working in the field of improving crop production by the use of polymers have hitherto believed that the standard grain sizes should be used and that the polymer mixture should be free of fine-grade particles or dust. Indeed, polymer products are considered defective and may be rejected if the standard grain sizes have more than five percent of fine-grade particles mixed in.

In the application method of the invention, however, it has been found advantageous to use some fine-grind particles, blended together with the standard sizes. Suitable mixtures have been achieved with 10-20% of the total material consisting of sub-0.5 mm particles and the remainder consisting of the 1-2 mm grade. The powdery portion of the polymers, particularly when injected under pressure, mix more thoroughly with the soil over a wider range of depths than the standard particles. In particular, the powder 34 (in FIG. 4) can pass upward from the zone through which blades 24 travel—which is in the lower portion of the root zone, to avoid damage—up into the root or seed zone, through the cracks temporarily caused by the travelling wave generated by the passage of blades 24.

Spread according to the process of the invention, therefore, powder 34 will permeate the earth thoroughly in a layer that includes the majority of plant roots. For example, the parameters already described have been used in fields to achieve an impregnation zone that extends through the top ten inches of topsoil, with blades 24 set so that their bottom edges pass through the soil at a level 10 inches below the surface.

If sufficient quantities of polymer are used, then powder 34 will mix with soil to create a moisture matrix surrounding the plant seeds, seedlings, or roots. The process creates a "moisture wrap" effect that surrounds the young plants with an entire zone of increased water-retaining soil. Too much powder, however, will create a gelatinous layer that will block oxygen and inhibit sprout growth.

The quantity of polymer depends on the density of the planted seeds. For example, satisfactory results have been achieved in alfalfa, which has relatively low seed density, with about 20 pounds per acre of the mixture specified above. Turf grass, however, has higher seed density and so might require about 150 pounds per acre.

Finer polymer grades differ from the larger granules in that they can absorb water faster. Sizes less than 0.5 mm, for example, may absorb water four times as fast as the 1-2 mm grade. The cost of that higher absorbency, however, is reduced durability, because the powder form loses its effectiveness faster. That effect is heightened in the highest layers of soil, where ultraviolet radiation can assist in breaking down the polymers even faster. Powder mixed in the top-most layers of soil, for example, may lose its effectiveness within perhaps six months.

In the process of this invention, the powder emplacement nevertheless has an important role. As stated, the process can be used to impregnate unplanted fields with a variety of particulate matter. The embodiment of the inventive process that includes using water-absorbent polymers to improve plant growth, though, has particularly beneficial application to pre-planted fields. In pre-planted fields, the moisture-wrap effect caused by the use of the powdery grades improves the growth of the plants in the early growth stages. At the same time, the powder nearest the surface can absorb moisture directly from the atmosphere, providing an additional water resource. It is precisely the early growth stages that are most critical to the long-term survival and productivity of the plants. Even if some of the powder degrades relatively quickly, therefore, the plants will have already benefitted at the time that they need it most.

Figure 6:
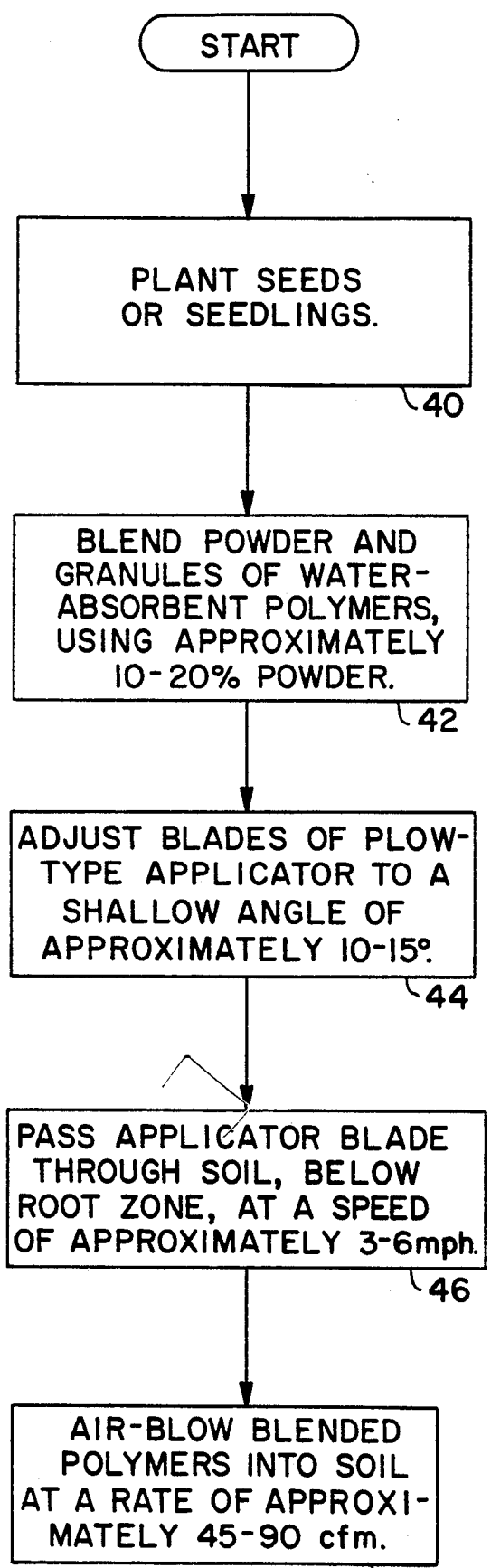

FIG. 6, showing one preferred embodiment of the invention, illustrates a process used for a pre-seeded application. First, the field is planted with seeds (see 40). In some applications, such as turf improvement, the seeds may already have begun growing. Next, the polymer blend, including powder, is created and placed in the hopper of the applicator (see 42). The preferred embodiment of the process calls for use of a polymer blend that includes the larger, granular grades of polymer, if economically feasible, as well as powder. When the plants grow bigger, the roots grow to find the individual lumps formed from the larger crystals. The larger crystals are generally located in a layer below that of the powder, where the roots of the larger, more mature plants are likely to need them. The roots actually grow to, around, and through the larger crystals. Because the larger crystals are more durable, the plants may draw on their water-absorbent qualities for a long time. Thus, the blend of polymer grades assists the plants throughout their lifetimes.

If it has not already been preset, the plowblade of the applicator is set at an appropriate angle (see 44). The adjusted applicator blade is passed through the soil at an appropriate, selectable depth below the seeds or at a suitable level of the root zone, and the applicator is driven at a suitably fast speed (see 46). Meanwhile, the blended polymers are air-blown into the soil at the appropriate pressure (see 48), creating an impregnation zone extending from the larger particles, which are located approximately at the level of the bottom of the plowblade, to the smaller particles, which extend above the top of the plowblade to the surface.

The process of the invention creates surprisingly increased germination rates, with improvements of up to forty percentage points over control plots. The process is useful with cash crops such as wheat, lettuce, barley, sorghum, alfalfa, and others, as well as with turf grasses. The improved germination rates allow faster growth with fewer seeds and less water. For example, use of the process might permit a newly planted golf course to open two to four weeks sooner than it could otherwise and use 30 to 60 percent less water during its operation, generating obvious economic benefits. The process also improves the probability of sprout emergence, by reducing soil crusting, and reduces growing stress on the plants, by permitting more regular water availability, all of which improves plant yield.

It is understood by those skilled in the art that numerous alternate forms and embodiments of the invention can be devised without departing from its spirit and scope.

I claim:

1. A method of treating soil to promote plant growth comprising:
   (a) preparing for dispersion a quantity of dry particles including at least one water-absorbent polymer, at least 10 percent of which polymer particles, by weight, have grain sizes no greater than half a millimeter, and placing the particles in an applicator;
   (b) passing at least one plowblade coupled to the applicator in a plane substantially parallel to and below the surface of a planted field; and
   (c) air-blowing a quantity of the particles including the polymer particles into a zone of soil below the field and adjacent to the plane of the plowblade.

2. The method of claim 1 wherein the act of air-blowing the particles includes impregnating the dry particles into a three-dimensional zone of soil extending above the plane of the plowblade.

3. The method of claim 2 including preparing for dispersion particles of water-absorbent polymer composed of between 55 and 80 percent cross-linked polyacrylamides and the remainder polyacrylate.

4. The method of claim 3 including preparing for dispersion polymer particles, no more than 20 percent of which, by weight, have grain sizes no greater than half a millimeter.

5. The method of claim 1 wherein passing the plowblade through the soil includes moving the applicator and the plowblade at a speed of three to six miles per hour.

6. The method of claim 4 wherein passing the plowblade through the soil includes moving the applicator and the plowblade at a speed of three to six miles per hour.

7. The method of claim 1 including air-blowing particles through each outlet into the soil at a rate of between 45 and 90 cubic feet of air and particles per minute.

8. The method of claim 10 including air-blowing particles through each outlet into the soil at a rate of between 45 and 90 cubic feet of air and particles per minute.

9. The method of claim 1 further comprising setting the plowblade, before passing it through the soil, so that a face is tilted at an angle of at least five and no more than 20 degrees from a plane parallel to the surface of the field.

10. The method of claim 6 further comprising setting the plowblade, before passing it through the soil, so that a face is tilted at an angle of at least five and no more than 20 degrees from a plane parallel to the surface of the field.

11. A method of injecting particles below the surface of a soil field comprising:
   (a) preparing for dispersion a quantity of particles, at least 10 percent of which, by weight, have grain sizes no greater than half a millimeter, and placing the particles in an applicator;
   (b) setting at least one plowblade coupled to the applicator so that a face of the plowblade is tilted at an angle of at least five and no more than 20 degrees from a plane parallel to the surface of the field;
   (c) passing the applicator across the field so as to cause the plowblade to pass through the soil in a plane parallel to and below the surface of the field; and
   (d) air-blowing the particles to distribute them throughout a three-dimensional volume of soil near the plane of the plowblade.

12. The method of claim 11 wherein passing the applicator across the field includes moving the plowblade at a speed of at least three mph.

13. The method of claim 11 wherein air-blowing includes impregnating a zone of soil extending above the plane of the plowblade.

14. The method of claim 11 wherein setting the plowblade includes tilting a face of the plowblade to an angle of 10 to 15 degrees from a plane parallel to the surface of the field.

15. The method of claim 11 wherein air-blowing includes impregnating a zone of soil extending above the plane of the plowblade and wherein setting the plowblade includes tilting a face of the plowblade to an angle of 10 to 15 degrees from a plane parallel to the surface of the field.

16. The method of claim 11 including selecting at least one type of dry particles from the set of water-absorbent polymers, pesticides, herbicides, fertilizer, and plant seeds.

17. The method of claim 15 including selecting at least one type of dry particles from the set of water-absorbent polymers, pesticides, herbicides, fertilizer, and plant seeds.

18. The method of claim 17 wherein air-blowing includes applying air pressure so as to force the particles through an outlet and into the soil at a rate of between 45 and 90 cubic feet of air and particles per minute.

19. The method of claim 11 wherein passing the applicator across the field comprises passing the plowblade below the surface of a planted field.

20. A method of injecting particles below the surface of a soil field comprising:
   (a) preparing for dispersion a quantity of particles, at least 10 percent of which, by weight, have grain sizes no greater than half a millimeter, and placing the particles in an applicator;
   (b) setting at least one plowblade coupled to the applicator so that a face of the plowblade is tilted at an angle of at least five and no more than 20 degrees from a plane parallel to the surface of the field;
   (c) passing the applicator across the field so as to cause the plowblade to pass through the soil in a plane parallel to and below the surface of the field;
   (d) oscillating the plowblade in a horizontal plane as it passes through the soil; and
   (e) air-blowing the particles to distribute them throughout a three-dimensional volume of soil near the plane of the plowblade.

21. A method of injecting particles below the surface of a soil field comprising:
   (a) preparing for dispersion a quantity of water-absorbent polymers of different grain sizes, at least 10 percent of which polymers, by weight, have grain sizes no greater than half a millimeter;
   (b) passing an applicator having at least one plowblade coupled to the applicator across the field so as to cause the plowblade to pass through the soil in a plane parallel to and below the surface of the field; and
   (c) air-blowing the prepared grains to distribute them throughout a three-dimensional volume of soil near the plane of the plowblade.

22. The method of claim 21 including creating a polymer mixture in which at least 80 percent, by weight, includes particles with grain sizes greater than one millimeter.

23. The method of claim 21 wherein passing the applicator across the field comprises passing the plowblade below the surface of a planted field, and further comprising setting the plowblade so that a face of the plowblade is tilted at an angle of at least five and no more than 20 degrees from a plane parallel to the surface of the field.

24. The method of claim 22 wherein passing the applicator across the field comprises passing the plowblade below the surface of a planted field, and further comprising setting the plowblade so that a face of the plowblade is tilted at an angle of at least five and no more than 20 degrees from a plane parallel to the surface of the field.

25. A method of injecting particles below the surface of a planted field comprising:
(a) preparing for dispersion a quantity of at least one type of dry particles selected from the set of water-absorbent polymers, pesticides, herbicides, fertilizer, and plant seeds, at least 10 percent of which, by weight, have grain sizes no greater than half a millimeter;
(b) setting at least one plowblade coupled to an applicator so that a face of the plowblade is tilted at an angle of at 10 to 15 degrees from a plane parallel to the surface of the field;
(c) passing the applicator across the planted field so as to cause the plowblade to pass through the soil in a plane parallel to and below the surface of the field; and
(d) air-blowing the particles to distribute them throughout a three-dimensional volume of soil near, and extending above, the plane of the plowblade.

* * * * *